(12) United States Patent
Amemiya

(10) Patent No.: US 12,552,015 B2
(45) Date of Patent: Feb. 17, 2026

(54) JOINT STRUCTURE FOR ROBOT

(71) Applicant: FANUC CORPORATION, Yamanashi (JP)

(72) Inventor: Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/839,062

(22) PCT Filed: Mar. 30, 2022

(86) PCT No.: PCT/JP2022/015908
§ 371 (c)(1),
(2) Date: Aug. 16, 2024

(87) PCT Pub. No.: WO2023/188088
PCT Pub. Date: Oct. 5, 2023

(65) Prior Publication Data
US 2025/0153347 A1    May 15, 2025

(51) Int. Cl.
*B25J 9/10*    (2006.01)
(52) U.S. Cl.
CPC .................. *B25J 9/102* (2013.01)
(58) Field of Classification Search
CPC ... F16H 2057/0221; F16H 2057/02073; F16H 2057/02021; F16H 1/26; F16H 1/14; B25J 9/102; B25J 9/103; B25J 17/0241
USPC ............................................. 74/396, 490.03
See application file for complete search history.

(56) References Cited

U.S. PATENT DOCUMENTS 5,743,145 A * 4/1998 Terada ................. F16H 55/20
74/420

FOREIGN PATENT DOCUMENTS

| EP | 0089129 A2 * | 2/1983 | ............. B25J 11/00 |
|---|---|---|---|
| JP | S62-063074 A | 3/1987 | |
| JP | S63-034090 A | 2/1988 | |
| JP | H04-089677 U | 8/1992 | |
| JP | 2021-094612 A | 6/2021 | |
| JP | 2022-070647 A | 5/2022 | |
| KR | 10-2018-0001957 A | 1/2018 | |

* cited by examiner

*Primary Examiner* — T. Scott Fix
(74) *Attorney, Agent, or Firm* — Renner, Otto, Boisselle & Sklar, LLP

(57) ABSTRACT

A joint structure for a robot includes a hollow first member, a second member, and an actuator that relatively rotates the first member and the second member about a first axis. The actuator includes a motor that is housed in the first member and that rotates a shaft about a second axis intersecting the first axis. A reducer decelerates a rotation of the shaft to transmit the rotation to the second member, and a power transmission mechanism transmits power from the motor to the reducer. The power transmission mechanism includes a first gear fixed to the shaft, a second gear coaxially mounted on the reducer meshes with the first gear, and a holder mounts the first gear so as to be positionally adjustable in a direction along the second axis and mounts the second gear so as to be positionally adjustable in a direction along the first axis.

5 Claims, 9 Drawing Sheets

JOINT STRUCTURE FOR ROBOT

This application is a national phase of International Application No. PCT/JP2022/015908, filed Mar. 30, 2022, which is incorporated herein by reference in its entirety.

TECHNICAL FIELD

The present disclosure relates to a joint structure for a robot.

BACKGROUND ART

In the related art, there is a known joint structure for a robot, in which a motor is housed in an arm and an axis of the motor is disposed in a direction orthogonal to a rotation axis of the arm by using bevel gears (for example, see Patent Literature 1). It is difficult to perform meshing adjustment of the bevel gears while performing the work of attaching the motor to the interior of the arm. Because of this, a pair of spur gears that do not require meshing adjustment are provided in a power transmission member between the motor and a reducer so that the motor and the reducer are configured to be separable at the position where the pair of spur gears are provided, and this configuration makes it possible to adjust meshing of the bevel gears outside of the arm.

Citation List

Patent Literature

{PTL 1} Japanese Unexamined Patent Application, Publication No. 2021-94612

SUMMARY OF INVENTION

An aspect of the present disclosure is a joint structure for a robot, the joint structure including a hollow first member, a second member, and an actuator that relatively rotates the first member and the second member about a first axis, wherein: the actuator includes a motor that is housed in the first member and that rotates a shaft about a second axis intersecting the first axis, a reducer that decelerates a rotation of the shaft to transmit the rotation to the second member, and a power transmission mechanism that transmits a power of the motor to the reducer; and the power transmission mechanism includes a first gear that is fixed to the shaft, a second gear that is coaxially mounted on the reducer and that meshes with the first gear, and a holder that mounts the first gear so as to be positionally adjustable in a direction along the second axis and that mounts the second gear so as to be positionally adjustable in a direction along the first axis.

DESCRIPTION OF EMBODIMENTS

A joint structure 1 for a robot 100 according to an embodiment of the present disclosure will be described below with reference to the drawings.

Figure 1:
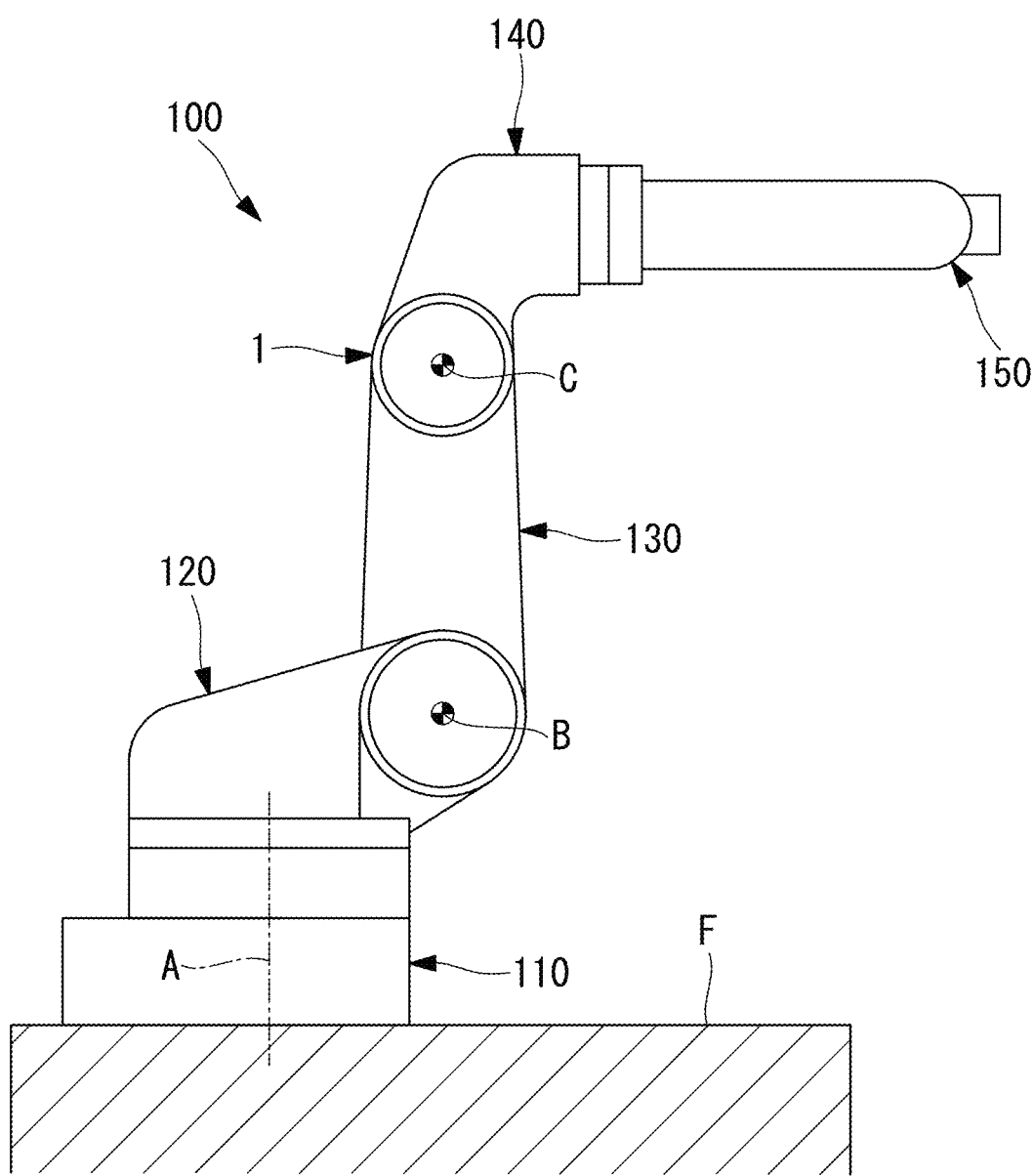
FIG. 1 is a schematic diagram showing an example of a robot provided with a joint structure according to an embodiment of the present disclosure.

The robot 100 equipped with the joint structure 1 according to this embodiment is, for example, as shown in FIG. 1, a vertical six-axis articulated robot and includes: a base 110 that is installed on a floor F; and a revolving drum 120 that is supported so as to be rotatable about a vertical axis A with respect to the base 110.

In addition, the robot 100 includes: a first arm (first member) 130 that is supported so as to be rotatable about a horizontal axis B with respect to the revolving drum 120; and a second arm (second member) 140 that is supported so as to be rotatable about a horizontal first axis C with respect to the first arm 130. Furthermore, the robot 100 includes a three-axis wrist unit 150 at the distal end of the second arm 140.

Figure 2:
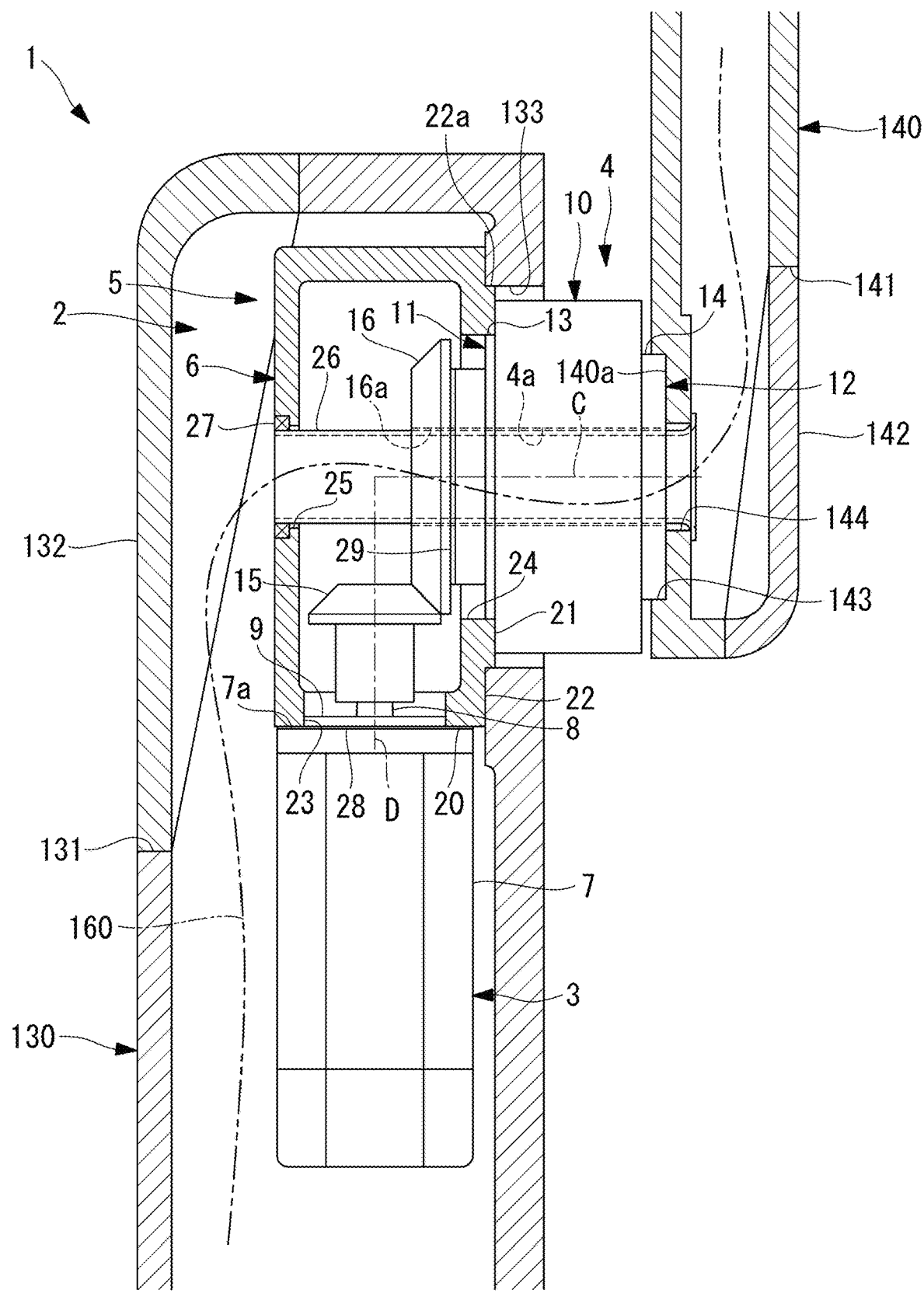
FIG. 2 is an enlarged longitudinal sectional view showing the joint structure in FIG. 1.

The joint structure 1 for the robot 100 according to this embodiment is, for example, as shown in FIG. 2, a rotary joint structure configured between the first arm 130 and the second arm 140. The joint structure 1 includes the first arm 130, the second arm 140, and an actuator 2 that rotationally drives the second arm 140 about the first axis C with respect to the first arm 130.

Each of the first arm 130 and the second arm 140 is configured in a hollow tubular shape having an internal space. The first arm 130 and the second arm 140 respectively include openings 131, 141 for allowing the inside and outside thereof to communicate, and lid members 132, 142 for opening and closing the openings 131, 141 in a detachable manner.

The actuator 2 includes a motor 3, a reducer 4, and a gearbox (power transmission mechanism) 5 that transmits the driving power of the motor 3 to the reducer 4.

The motor 3 includes a motor housing 7 including a motor flange 7a that is detachably fixed to a holder 6 of the gearbox 5 by means of bolts (not shown), and a shaft 8 that extends from the center of the motor flange 7a in a direction orthogonal to the motor flange 7a and that is rotatable about a second axis D. The motor flange 7a is provided with, on a radially inner side thereof, a spigot joint portion 9 having a cylindrical surface that protrudes one step with respect to the motor flange 7a. The motor flange 7a has a plurality of through-holes (not shown) that are provided radially outward of the spigot joint portion 9 and that extend in the direction of the second axis D of the shaft 8.

The reducer 4 includes a cylindrical case 10 that is detachably fixed to the holder 6 of the gearbox 5 by means of bolts (not shown), and an input shaft member 11 that is provided at one end in the axial direction of the case 10 and that has an annular end surface to which the driving power of the motor 3 is input. In addition, the reducer 4 includes an output shaft member 12 that is provided at the other end of the case 10 and that outputs the reduced driving power.

The case 10 is provided with, on an end surface on the input shaft member 11 side, a spigot joint portion 13 extending in the axial direction centered on the axis of the reducer 4. The case 10 of the reducer 4 has a plurality of through-holes (not shown) that are provided radially outward of the spigot joint portion 13 so as to be arranged at intervals in the circumferential direction and that extend in the axial direction of the reducer 4.

In addition, the output shaft member 12 of the reducer 4 is provided with: a spigot joint portion 14 that is fitted into a recessed portion 143 provided in an attachment surface 140*a* of the second arm 140; and a plurality of screw holes (not shown) for fastening bolts (not shown) penetrating through through-holes (not shown) provided in the attachment surface 140*a* of the second arm 140. The second arm 140 is provided with, at the center of the attachment surface 140*a*, a central hole 144 for opening the internal space of the second arm 140 to the outside.

In addition, the reducer 4 is provided with, in a region including the central axis thereof, a hollow hole 4*a* penetrating along the axis.

The gearbox 5 includes: a first gear 15 that is fixed to the shaft 8 of the motor 3; a second gear 16 that is fixed to the input shaft member 11 of the reducer 4; and the holder 6 that defines a housing space for housing the first gear 15 and the second gear 16. The first gear 15 and the second gear 16 are configured of bevel gears that mesh with each other.

Figure 3:
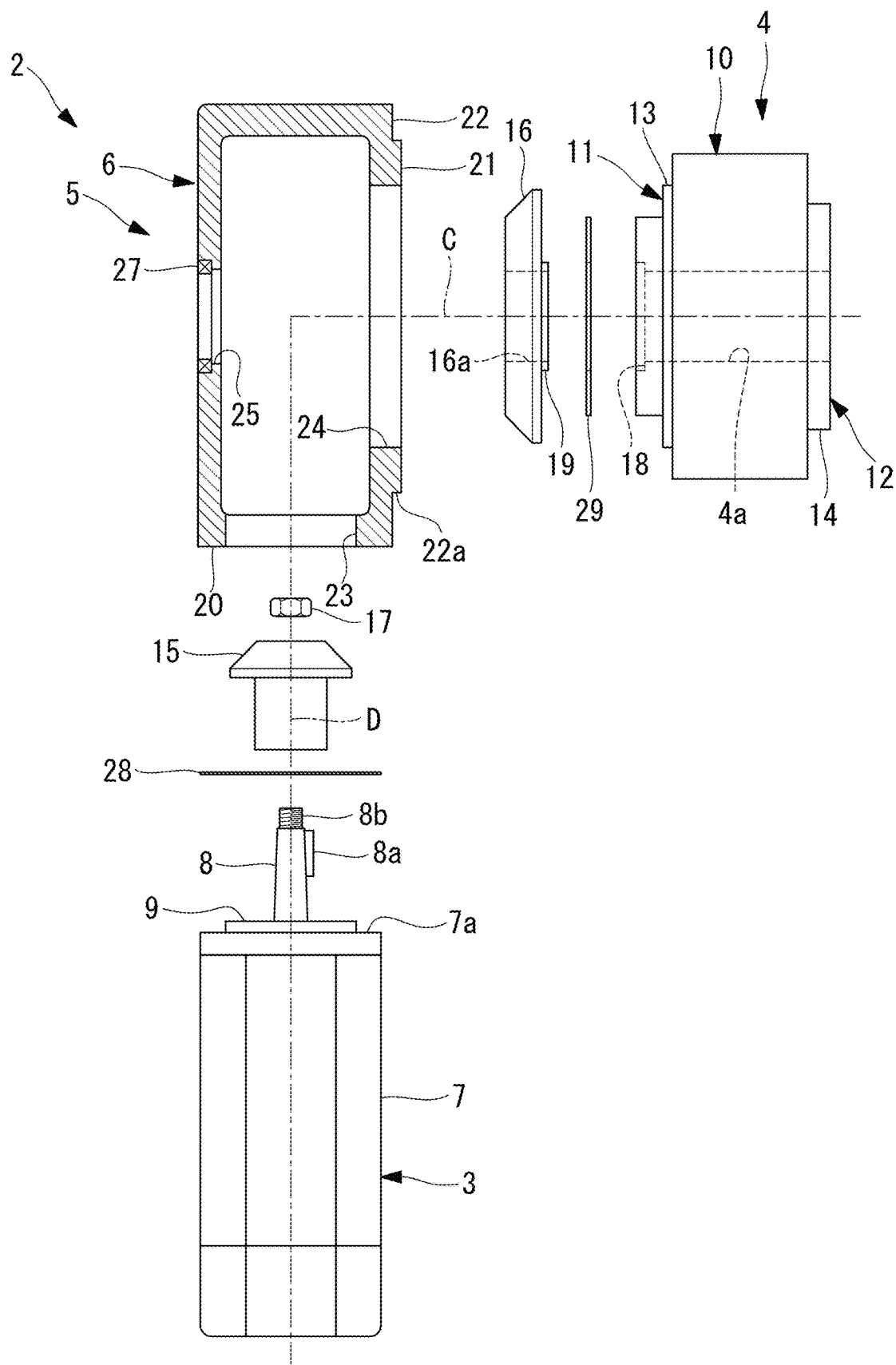
FIG. 3 is an exploded longitudinal sectional view showing an actuator provided in the joint structure in FIG. 1.

The first gear 15 is provided with a central hole (not shown) through which the shaft 8 of the motor 3 passes, and as shown in FIG. 3, as a result of a nut 17 being fastened to a male screw 8*b* at the distal end of the shaft 8 passing through the central hole, the first gear 15 is fixed to the shaft 8 of the motor 3. A key 8*a* is attached to the shaft 8 of the motor 3, and the central hole of the first gear 15 is provided with a key groove (not shown) into which the key 8*a* is inserted. While the key 8*a* is inserted into the key groove, the nut 17 is fastened to the male screw 8*b* at the distal end of the shaft 8 passing through the central hole, whereby the first gear 15 is fixed to the shaft 8 of the motor 3.

The second gear 16 is a ring gear having a central hole 16*a* and has a pitch circle radius that is sufficiently larger than the pitch circle radius of the first gear 15. The second gear 16 is provided with: a plurality of through-holes (not shown) that are formed around the central hole 16*a* at intervals in the circumferential direction and through which bolts (not shown) pass; and a spigot joint portion 19 that is fitted into a recessed portion 18 provided at the distal end of the input shaft member 11 of the reducer 4. As a result of the spigot joint portion 19 being fitted into the recessed portion 18 and the bolts passing through the through-holes being fastened into screw holes (not shown) formed in the input shaft member 11, the second gear 16 is fixed to the end surface of the input shaft member 11 in a positioned state.

The holder 6 is a hollow box-shaped member that defines the housing space in the interior thereof and includes: a first attachment surface 20 for fixing the motor flange 7*a* by means of bolts (not shown); and a second attachment surface 21 that is orthogonal to the first attachment surface 20 and that is for fixing the case 10 of the reducer 4 by means of bolts (not shown). In addition, as shown in FIG. 2, the holder 6 includes a third attachment surface 22 for fixing the holder 6 to a bearing surface provided on an inner surface of the first arm 130.

The first attachment surface 20 is provided with: a first fitting hole 23 that extends in a direction orthogonal to the first attachment surface 20 and that is for allowing the inside and outside of the holder 6 to communicate; and a plurality of screw holes (not shown) that are provided radially outward of the first fitting hole 23 so as to be arranged at intervals in the circumferential direction. The first fitting hole 23 is formed in a circular shape having an inner diameter larger than the outer diameter of the first gear 15 mounted on the shaft 8, and as a result of the spigot joint portion 9 provided on the motor flange 7*a* being fitted into the first fitting hole 23, the shaft 8 of the motor 3 is radially positioned.

The positions of the screw holes with respect to the center of the first fitting hole 23 coincide with the positions of the through-holes provided in the motor flange 7*a* with respect to the second axis D of the shaft 8, and as a result of bolts (not shown) passing through the through-holes being fastened into the screw holes, the motor 3 can be fixed to the holder 6.

The second attachment surface 21 is provided with: a second fitting hole 24 that extends in a direction orthogonal to the second attachment surface 21 and that is for allowing the inside and outside of the holder 6 to communicate; and a plurality of screw holes (not shown) that are provided radially outward of the second fitting hole 24 so as to be arranged at intervals in the circumferential direction. The second fitting hole 24 is formed in a circular shape having an inner diameter larger than the outer diameter of the second gear 16 mounted on the input shaft member 11, and as a result of the spigot joint portion 13 provided on the end surface on the input shaft member 11 side of the case 10 of the reducer 4 being fitted into the second fitting hole 24, the reducer 4 is radially positioned.

The positions of the screw holes with respect to the center of the second fitting hole 24 coincide with the positions of the through-holes provided in the case 10 with respect to the axis thereof, and as a result of bolts (not shown) passing through the through-holes being fastened into the screw holes, the reducer 4 can be fixed to the holder 6.

The third attachment surface 22 is formed in an annular shape disposed radially outward of the second attachment surface 21. The bearing surface in the interior of the first arm 130 is provided with: a third fitting hole 133 that penetrates in a direction orthogonal to the bearing surface; and a plurality of through-holes (not shown) that are provided radially outward of the third fitting hole 133 so as to be arranged at intervals in the circumferential direction. A spigot joint portion 22*a* that can be fitted into the third fitting hole 133 is provided on the third attachment surface 22 so as to protrude in a direction orthogonal to the third attachment surface 22.

The third attachment surface 22 is provided with a plurality of screw holes (not shown) that are provided around the central axis of the second fitting hole 24 at intervals in the circumferential direction. As a result of the spigot joint portion 22*a* on the third attachment surface 22 being fitted into the third fitting hole 133 of the first arm 130 and bolts (not shown) passing through the through-holes around the third fitting hole 133 being fastened into the screw holes in the third attachment surface 22, the holder 6 can be fixed to the first arm 130 in a positioned state.

In addition, the holder 6 is provided with, in a wall surface facing the second fitting hole 24, an opening 25 that opens the housing space to the outside on the extension of the first axis C. As a result of the reducer 4 mounted with the second gear 16 being attached to the holder 6, the hollow hole 4*a* of the reducer 4, the central hole 16a of the second gear 16, and the opening 25 of the holder 6 are arranged in a line on the first axis C.

Then, as shown in FIG. 2, a cylindrical body (tubular body) 26 is disposed penetrating through the hollow hole 4a, the central hole 16a, and the opening 25. One end of the cylindrical body 26 is fixed to the second arm 140, and the other end of the cylindrical body 26 is sealed so as to be rotatable with respect to the holder 6 by means of an annular seal member 27 disposed in the opening 25. Thus, a space around the first axis C from the reducer 4 to the opening 25 is partitioned from the housing space in a sealed state. In addition, the internal space of the first arm 130 and the internal space of the second arm 140 communicate with each other through the internal space of the cylindrical body 26.

Figure 4:
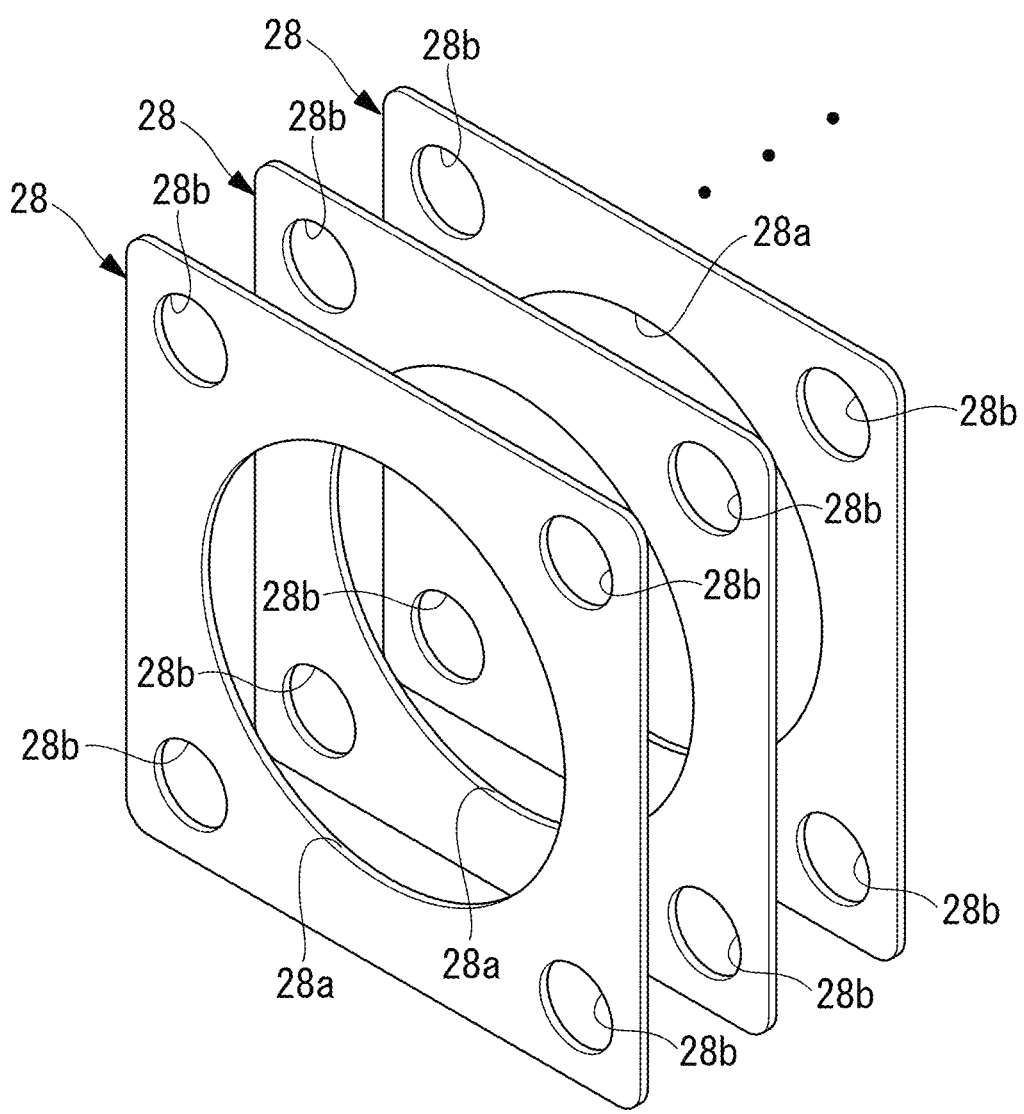
FIG. 4 is a perspective view showing an example of a first shim provided in the actuator in FIG. 3.

In addition, as shown in FIGS. 2 and 3, the joint structure 1 according to this embodiment includes: a first shim 28 that is sandwiched between the motor flange 7a and the first attachment surface 20; and a second shim 29 that is sandwiched between the end surface of the input shaft member 11 of the reducer 4 and the second gear 16. As shown in FIG. 4, the first shim 28 has an outer shape equivalent to the outer shape of the motor flange 7a, and includes a central hole 28a having an inner diameter dimension equivalent to the inner diameter of the first fitting hole 23 and through-holes 28b that are arranged at positions coinciding with the through-holes of the motor flange 7a.

As the first shim 28, shims with various thickness dimensions may be prepared, or as shown in FIG. 4, the thickness dimension may be adjusted by changing the number of stacked shims. As the thickness of the first shim 28 is increased, the position of the motor flange 7a moves in a direction away from the first attachment surface 20 along the second axis D orthogonal to the first axis C; thus, the motor 3 and the first gear 15 fixed to the shaft 8 can be mounted on the holder 6 so as to be positionally adjustable in a direction along the second axis D.

Figure 5:
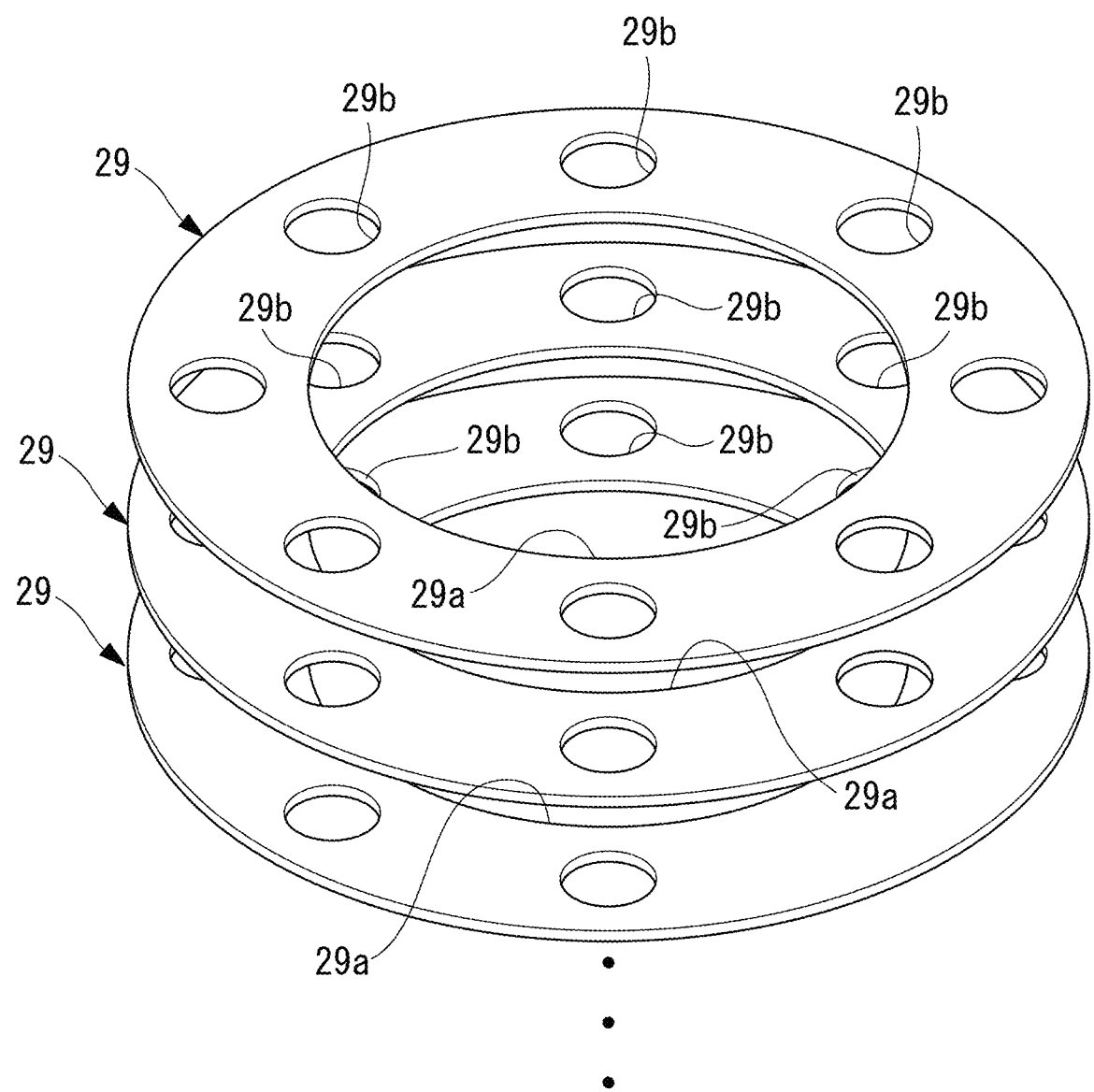
FIG. 5 is a perspective view showing an example of a second shim provided in the actuator in FIG. 3.

As shown in FIG. 5, the second shim 29 has an outer shape equivalent to the outer shape of the end surface of the input shaft member 11 of the reducer 4, and includes a central hole 29a having an inner diameter equivalent to or greater than the outer diameter of the spigot joint portion 19 of the second gear 16 and through-holes 29b that are arranged at positions coinciding with the through-holes of the second gear 16. As the second shim 29 also, shims with various thickness dimensions may be prepared, or as shown in FIG. 5, the thickness dimension may be adjusted by changing the number of stacked shims.

As the thickness of the second shim 29 is increased, the position of the second gear 16 with respect to the end surface of the input shaft member 11 of the reducer 4 moves in a direction away from the end surface of the input shaft member 11 along the first axis C; thus, the second gear 16 can be mounted on the holder 6 so as to be positionally adjustable in a direction along the first axis C.

The operation of the thus-configured joint structure 1 for the robot 100 according to this embodiment will be described below.

In order to assemble the joint structure 1 for the robot 100 according to this embodiment, as shown in FIG. 3, the shaft 8 of the motor 3 is fitted into the central hole of the first gear 15, and the nut 17 is fastened to the male screw 8b to manufacture a motor assembly in which the first gear 15 is fixed to the shaft 8.

In addition, a reducer assembly in which the input shaft member 11 of the reducer 4 and the second gear 16 are fixed to each other with the second shim 29 sandwiched therebetween is manufactured. The reducer assembly is manufactured by fitting the spigot joint portion 19 of the second gear 16 into the recessed portion 18 of the input shaft member 11 and fastening the bolts into the screw holes. At this time, the thickness of the second shim 29 is set to an appropriate thickness dimension, for example, a design value.

Next, the reducer assembly is attached to the holder 6 of the gearbox 5. As a result of the spigot joint portion 13 provided on the input shaft member 11 side of the case 10 of the reducer 4 being fitted into the second fitting hole 24 of the holder 6 and the bolts being fastened into the screw holes, the reducer assembly can be fixed to the second attachment surface 21 of the holder 6 in a positioned state.

Then, the first shim 28 having an appropriate thickness dimension, for example, a design value is sandwiched between the motor flange 7a and the first attachment surface 20 of the holder 6, and the first gear 15 of the motor assembly is inserted into the internal space of the holder 6 through the first fitting hole 23 to be meshed with the second gear 16. Subsequently, the motor 3 is fixed to the holder 6 by fastening the bolts.

Figure 6:
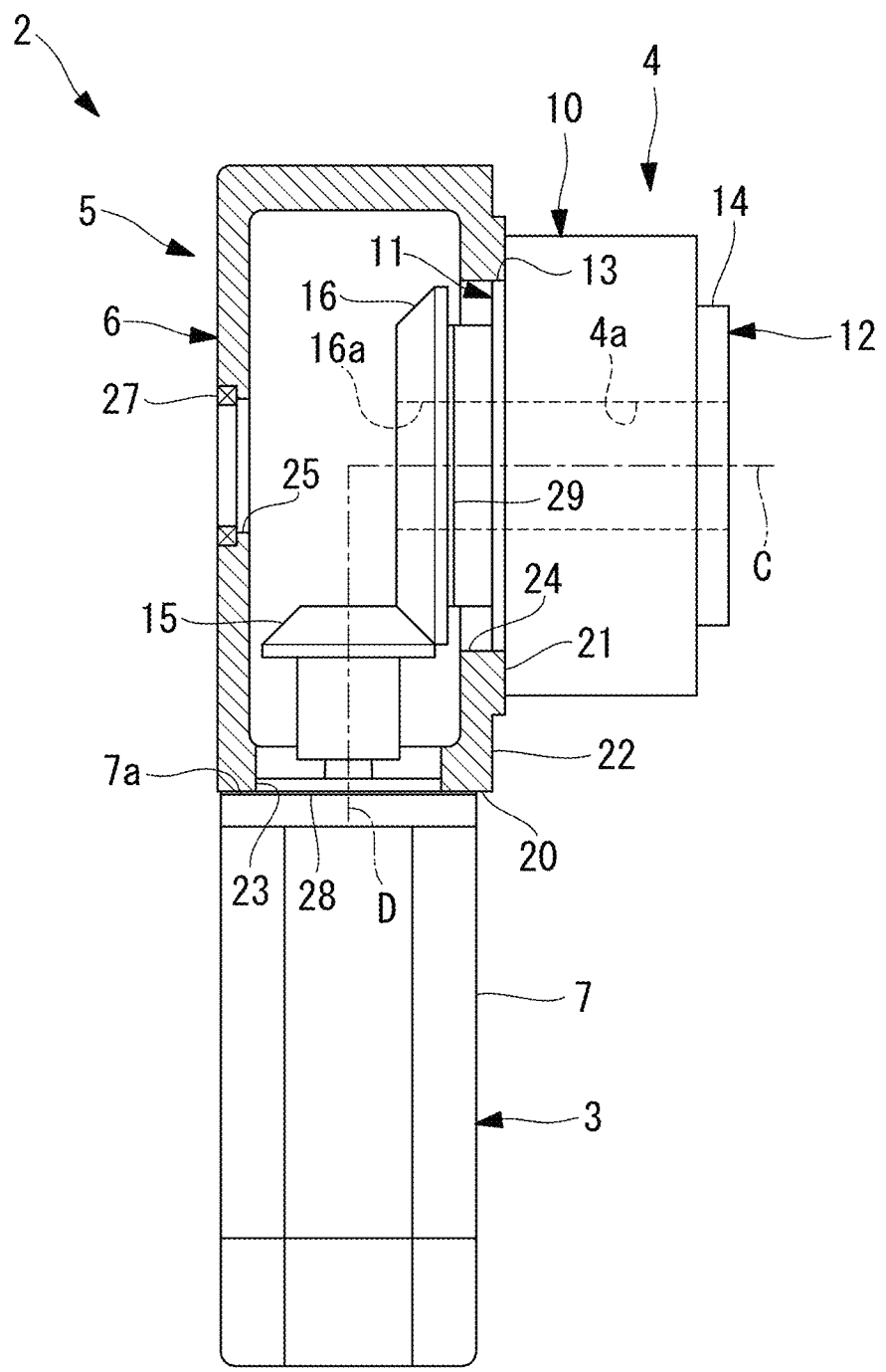
FIG. 6 is a longitudinal sectional view showing an assembly diagram of the actuator in FIG. 3.

In this state, the meshing between the first gear 15 and the second gear 16 is confirmed, and the motor assembly is attached and detached to adjust the thickness of the first shim 28 until proper meshing is achieved. In a case in which proper meshing cannot be achieved only by adjusting the thickness of the first shim 28, the reducer assembly is removed, and the second gear 16 is removed from the reducer 4 to adjust the thickness of the second shim 29. By doing so, as shown in FIG. 6, the actuator 2 including the motor 3, the reducer 4, and the gearbox 5 is configured such that the meshing between the first gear 15 and the second gear 16 is properly adjusted.

Figure 7:
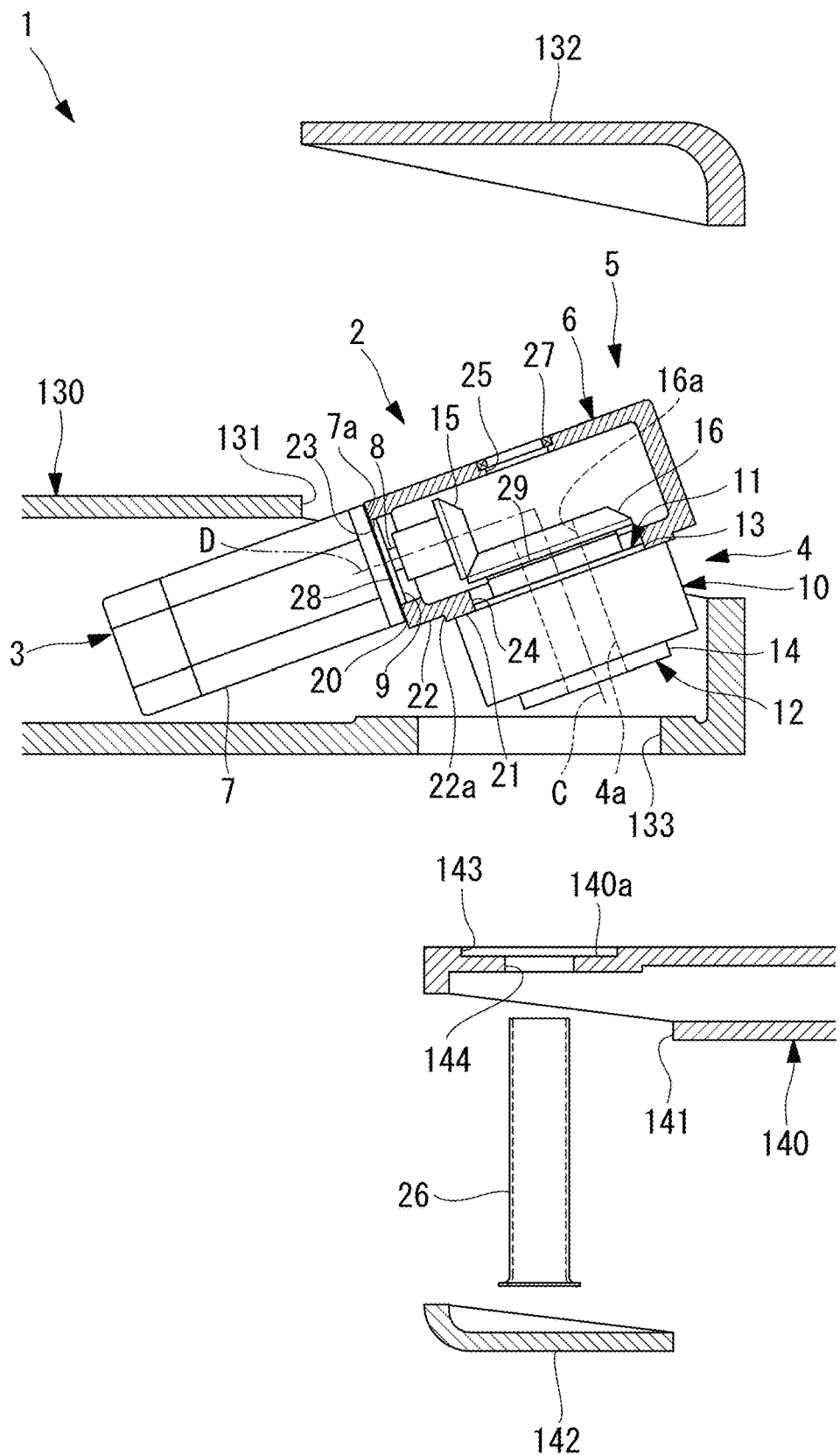
FIG. 7 is an exploded longitudinal sectional view for explaining the work of attaching the actuator in FIG. 4 to the interior of a first arm.

As shown in FIG. 7, the thus-configured actuator 2 is inserted into the internal space of the first arm 130 through the opening 131 in a state in which the lid member 132 is removed, and the spigot joint portion 22a provided on the third attachment surface 22 is fitted into the third fitting hole 133 provided in the first arm 130. Then, the third attachment surface 22 is brought into close contact with the bearing surface in the first arm 130, and the bolts are fastened to fix the actuator 2 to the first arm 130 in a positioned state.

In addition, the spigot joint portion 14 of the output shaft member 12 of the reducer 4 is fitted into the recessed portion 143 in the attachment surface 140a of the second arm 140, the end surface of the output shaft member 12 and the attachment surface 140a of the second arm 140 are brought into close contact with each other, and the bolts are fastened to fix the two components to each other. Then, the cylindrical body 26 is inserted through the opening 141 in a state in which the lid member 142 is removed and is made to pass through the central hole 144 of the second arm 140, the hollow hole 4a of the reducer 4, and the opening 25 of the holder 6, the one end of the cylindrical body 26 is fixed to the second arm 140, and the other end thereof is fitted into the seal member 27 attached to the opening 25.

By doing so, the joint structure 1 for the robot 100 according to this embodiment is configured. The cylindrical body 26 partitions the columnar space including the first axis C from the internal space of the holder 6 and the internal space of the reducer 4 in a sealed state. By filling the internal space of the holder 6 and the internal space of the reducer 4 with a lubricant, such as grease, the reducer 4, the first gear 15, and the second gear 16 are lubricated, while leakage of the lubricant to the inside of the cylindrical body 26 is prevented.

As described above, with the joint structure 1 for the robot 100 according to this embodiment, the actuator 2 including the motor 3, the reducer 4, and the gearbox 5 can be inserted into the interior of the first arm 130 after being assembled in the outside of the first arm 130. With this configuration, there is an advantage in that it is possible to perform the work of meshing adjustment between the first gear 15 and the second gear 16, which are configured of bevel gears that are rotatable about the axes C, D intersecting each other, in a wide space outside the first arm 130, thereby achieving good workability.

It is not necessary to perform the work of attaching the motor 3 having a relatively large mass to the internal space of the first arm 130 and the meshing adjustment work by means of the first shim 28 and the second shim 29 in the narrow internal space of the first arm 130, and this makes it possible to significantly improve the workability.

In addition, with this embodiment, the first gear 15 that is fixed to the shaft 8 of the motor 3 and the second gear 16 that is coaxially mounted on the reducer 4 are directly meshed with each other without interposing spur gears or the like between the first gear 15 and the second gear 16. With this configuration, there is an advantage in that it is possible to reduce the number of components, reduce the cost, enhance the transmission efficiency, and reduce the size of the gearbox 5.

In addition, because the second gear 16 is configured of a ring gear having a pitch circle radius larger than that of the first gear 15, it is also possible to decelerate the rotation of the shaft 8 of the motor 3 between the first gear 15 and the second gear 16. Therefore, it is possible to reduce the reduction ratio in the reducer 4, thereby achieving miniaturization of the reducer 4 and cost reduction.

In addition, the cylindrical body 26 is arranged so as to pass through the hollow hole 4a of the hollow reducer 4, the central hole 16a of the second gear 16 configured of a ring gear, and the opening 25 of the holder 6 and to surround the region including the first axis C. With this configuration, the internal space of the first arm 130 and the internal space of the second arm 140 can communicate with each other through the internal space of the cylindrical body 26.

In other words, wiring of a wire body 160 such as a cable, as indicated by a chain line in FIG. 2, from the first arm 130 to the second arm 140 can be performed through the internal space of the cylindrical body 26. As a result, even when the second arm 140 rotates about the first axis C with respect to the first arm 130, a large bend or twist is not generated in the wire body 160, and thus, it is possible to maintain the wire body 160 in a durably sound state.

Note that, in this embodiment, the second shim 29 between the input shaft member 11 of the reducer 4 and the second gear 16 is employed in addition to the first shim 28 between the motor flange 7a and the holder 6 to perform meshing adjustment. Alternatively, in a case in which the end surface on the input shaft member 11 side of the reducer 4 can be precisely placed with respect to the holder 6, the second shim 29 need not be employed. Because the adjustment work by means of the first shim 28 does not involve work of removing the first gear 15 from the shaft 8, the adjustment work can be performed in a shorter time than the adjustment work by means of the second shim 29.

In addition, although the actuator 2 is attached in the first arm 130 in this embodiment, alternatively, the actuator 2 may be attached in the second arm 140.

In addition, in this embodiment, the second gear 16 is fixed to the input shaft member 11 of the reducer 4. This configuration is preferable in the case in which the input shaft member 11 of the reducer 4 has an end surface to which the second gear 16 can be fixed.

Figure 8:
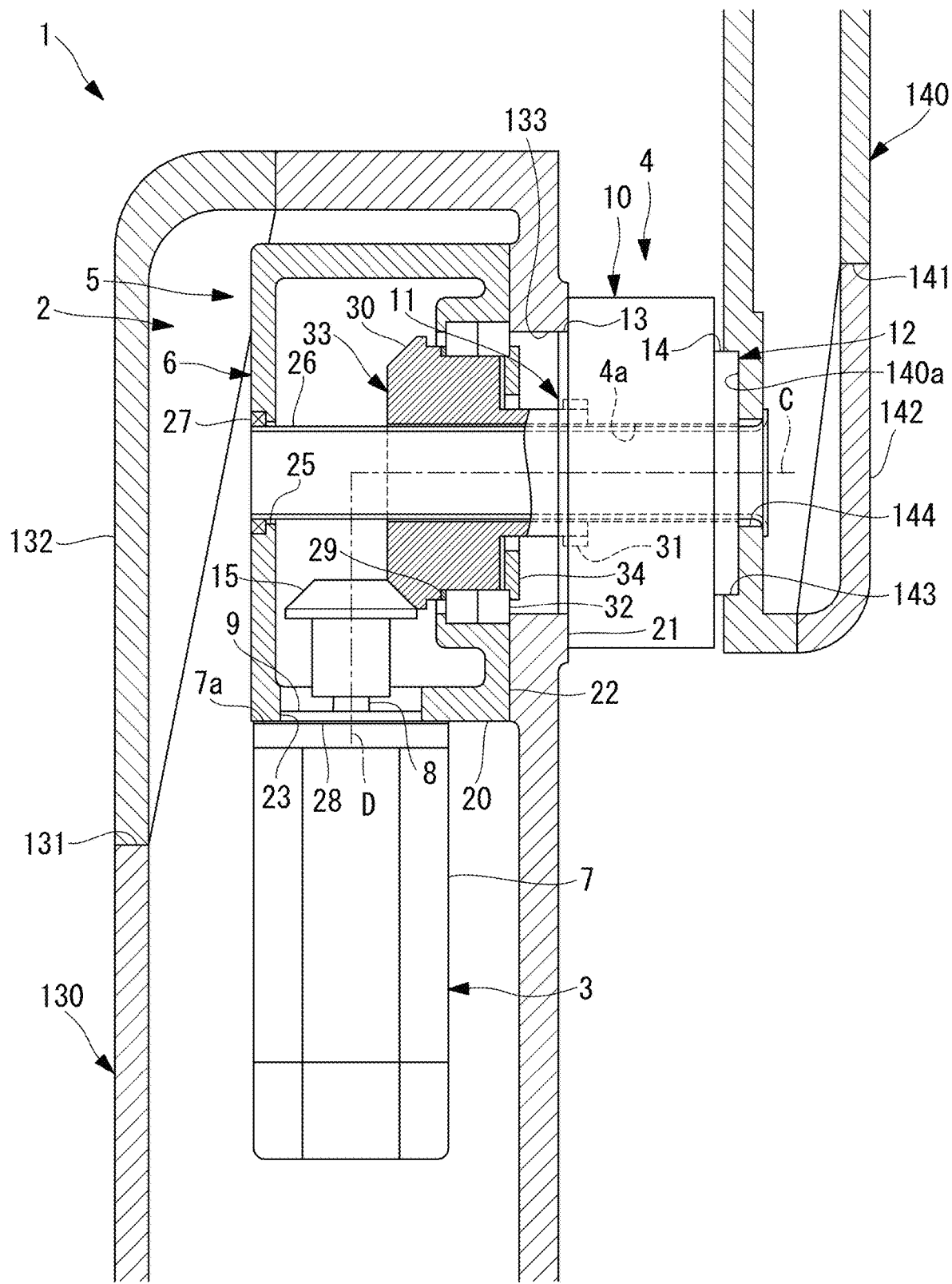
FIG. 8 is an enlarged longitudinal sectional view showing a modification of the joint structure in FIG. 1.

Alternatively, in a case in which the input shaft member 11 is provided by means of spur gears into which the reducer 4 is inserted in the middle or by means of a gear (not shown), such as a spline gear, that meshes with an input gear 31, it is desirable to have a configuration as shown in FIG. 8. In other words, it is permissible to employ a structure in which a gear member 33 having a second gear 30 configured of a bevel gear at one end and the input gear 31 at the other end is rotatably supported on the holder 6 by means of a bearing 32. In the figure, reference sign 34 indicates a pressing plate that presses the bearing 32 to the one end side, and the pressing plate is fixed to the second gear 30 by means of bolts (not shown).

In this case, the gear in the reducer 4 and the input gear 31 serve as shaft couplings that allow relative movement in a direction along the first axis C and that also restrict relative rotation about the first axis C. Therefore, it is not necessary to move the reducer 4 when the position of the second gear 30 is adjusted in the direction along the first axis C, and it suffices to fix the reducer 4 to the first arm 130 by fitting, from the outside, the spigot joint portion 13 provided on the case 10 into the third fitting hole 133 provided in the first arm 130. In this case, the second attachment surface 21 is provided on the outside of the first arm 130, and as a result of the spigot joint portion 13 provided on the end surface on the input shaft member 11 side of the case 10 of the reducer 4 being fitted into the third fitting hole 133, the reducer 4 is radially positioned.

Figure 9:
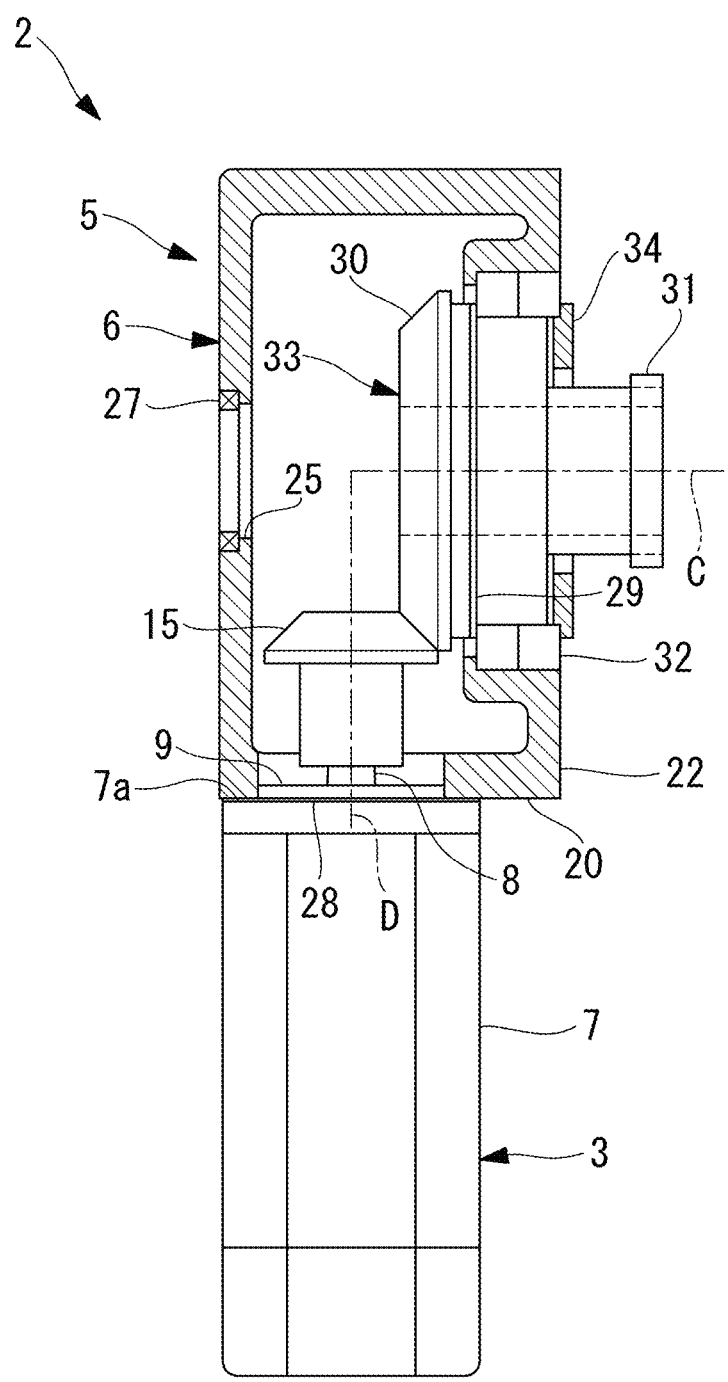
FIG. 9 is a longitudinal sectional view showing an assembly diagram of an actuator provided in the joint structure in FIG. 8.

In other words, as shown in FIG. 9, the actuator 2 can be configured by performing meshing adjustment, in the outside of the first arm 130, between the motor assembly and the holder 6 on which the gear member 33 is supported by means of the bearing 32. Then, the reducer 4 may be fixed from the outside of the first arm 130 after the actuator 2, in which the meshing adjustment is performed, is fixed to the interior of the first arm 130.

This configuration separately requires the bearing 32 and the pressing plate 34 for rotatably supporting the gear member 33 on the holder 6; however, the configuration affords the same effect as the abovementioned embodiment in that it is possible to perform meshing adjustment in the outside of the first arm 130.

In addition, although the bevel gears have been illustrated as an example of the first gear 15 and the second gear 16, the axes C, D of which are orthogonal to each other, in this embodiment, it is permissible to employ gears that intersect at an angle other than 90° or gears other than the bevel gears, which require meshing adjustment.

In addition, the shapes, materials, and thicknesses of the first shim 28 and the second shim 29 may be arbitrarily determined.

REFERENCE SIGNS LIST 1 joint structure
2 actuator
3 motor
4 reducer
4a hollow hole
5 gearbox (power transmission mechanism)
6 holder
8 shaft
15 first gear
16, 30 second gear
16a central hole 25 opening
26 cylindrical body (tubular body)
100 robot
130 first arm (first member)
140 second arm (second member)
C first axis
D second axis

The invention claimed is:

1. A joint structure for a robot, the joint structure comprising a hollow first member, a second member, and an actuator that relatively rotates the first member and the second member about a first axis, wherein:
   the actuator includes a motor that is housed in the first member and that rotates a shaft about a second axis intersecting the first axis, a reducer that decelerates a rotation of the shaft to transmit the rotation to the second member, and a power transmission mechanism that transmits a power of the motor to the reducer;
   the power transmission mechanism includes a first gear that is fixed to the shaft, a second gear that is coaxially mounted on the reducer and that meshes with the first gear, and a holder that mounts the first gear so as to be positionally adjustable in a direction along the second axis and that mounts the second gear so as to be positionally adjustable in a direction along the first axis;
   the holder includes a housing space that houses the first gear and the second gear, and an opening that opens the housing space to an outside on an extension of the first axis;
   the second gear is a ring gear having a central hole;
   the reducer includes a hollow hole penetrating along the first axis; and
   the joint structure further comprises a tubular body that is inserted so as to pass through the hollow hole and the central hole to reach the opening, and that partitions a space around the first axis from the reducer to the opening from the housing space in a sealed state.

2. The joint structure for a robot according to claim 1, wherein the motor is attached to the holder so as to be positionally adjustable in the direction along the second axis.

3. The joint structure for a robot according to claim 1, wherein:
   the reducer is detachably attached to the holder; and
   the second gear is fixed to the reducer so as to be positionally adjustable in the direction along the first axis.

4. The joint structure for a robot according to claim 1, wherein:
   the reducer is attached to the first member; and
   the second gear and the reducer are connected to each other by means of shaft couplings that allow relative movement in the direction along the first axis and that also restrict relative rotation about the first axis.

5. The joint structure for a robot according to claim 1, wherein a pitch circle radius of the second gear is larger than a pitch circle radius of the first gear.

* * * * *